United States Patent [19]
Anderson

[11] 3,797,899
[45] Mar. 19, 1974

[54] MULTIPLE LIP OUTER LAND RIDING SEAL

[75] Inventor: Lawrence G. Anderson, Greenhurst, N.Y.

[73] Assignee: TRW, Inc., Cleveland, Ohio

[22] Filed: Sept. 27, 1971

[21] Appl. No.: 183,950

[52] U.S. Cl............... 308/187.1, 277/25, 308/187.2
[51] Int. Cl. ............................................. F16c 33/78
[58] Field of Search ........ 308/187.1, 187.2; 277/25, 277/53, 95, 208

[56] References Cited
UNITED STATES PATENTS
2,856,246   10/1958   Gaubatz........................... 308/187.2
2,945,730   7/1960   Murray et al..................... 308/187.2

*Primary Examiner*—Charles J. Myhre
*Assistant Examiner*—Barry Grossman
*Attorney, Agent, or Firm*—Hill, Sherman, Meroni, Gross & Simpson

[57] ABSTRACT

A seal for anti-friction bearing assemblies having a pair of axially spaced apart lips adapted to ride against the inner diameter of the outer race of the bearing assembly, the inner diameter of the seal being backed by a rigid backing ring and being affixable to a shaft supported by the bearing assembly.

3 Claims, 3 Drawing Figures

PATENTED MAR 19 1974 3,797,899

MULTIPLE LIP OUTER LAND RIDING SEAL

BACKGROUND OF THE INVENTION

1. Field Of The Invention

This invention relates to anti-friction bearing assemblies and more particularly to a lip seal for said assemblies.

2. Prior Art

Lip seals for use in connection with anti-friction bearing assemblies are known to the art. Such prior art lip seals generally include an elastomeric member having a thin extension depending therefrom adapted 9to contact and ride against either an abutting ring member such as a flinger or against the outer diameter of the inner race. Lip seals having specific advantages as such the ability to accommodate shaft throw out and pressure bleeding which make them highly desirable in sealing anti-friction bearing assemblies.

However normal prior art lip seals have generally tended to be positioned on the stationary section of the assembly and contact the rotating portion. In this regard they are generally attached to the outer race and ride against the inner race or against the rotating shaft. Further they have often times contacted the abutting face at a flat angle which reduces the ability of the lip to bend to accommodate shaft throw out. In addition, single lip seals do not provide adequate sealing in certain embodiments. It has therefore been suggested to use multiple lip seals. Generally at It has therefore been suggested to use multiple lip seals. Generally the multiple lip seals have again been attached to the stationary member of the assembly and have normally been brought into contact with additional abutment members such as abutment rings or flingers. This has required provision of additional parts.

SUMMARY

This invention overcomes disadvantages found in connection with prior art lip seals and provides a dual lip seal which is attached to the shaft of the assembly and which rides against the inner diameter of the outer race member. The centrifugal force of the rotating seal is used to increase the sealing pressure of the lips againt the inner diameter of the race. In addition, the lips are angled with respect to the axis thereby increasing the ability of the lip to expand under the action of centrifugal force while the same time maintaining the ability of the lip to bleed under excessive internal pressure conditions.

The seal consists of an L-shaped cross section backing ring, the short leg of which is adapted to be attached to the outer diameter of the shaft. The long leg accommodates, on its outer diameter, an elastomeric body having an axial length. Positioned at one end of the axial body is a radially thickened portion which terminates at its radial outer diameter in two axially spaced apart circumferential lips which project outwardly at an angle to the radius and which terminate in flat surfaces at an angle to the axis.

The seal is used in an assembly where the inner surface of the outer race provides the mating face of the lip. Preferably the outer race is ledged at one end to provide a specific chamber in which the lip will operate and a specific face against which the lip will ride.

It is therefore an object of this invention to provide an improved lip seal for anti-friction bearing assemblies.

It is another object of this invention to provide a multiple lip seal for use in connection with anti-friction bearing assemblies, the lips being axially spaced from one another.

It is a more important and specific object of this invention to provide an anti-friction bearing assembly having a multiple lip seal associated therewith, the lip seal riding on the shaft and sealing against the outer race of the bearing assembly, the seal including a pair of lips projecting at an angle to the radius and formed of an elastomer.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

DESCRIPTION OF THE PREFERRED EMBODIMENT

Figure 1:
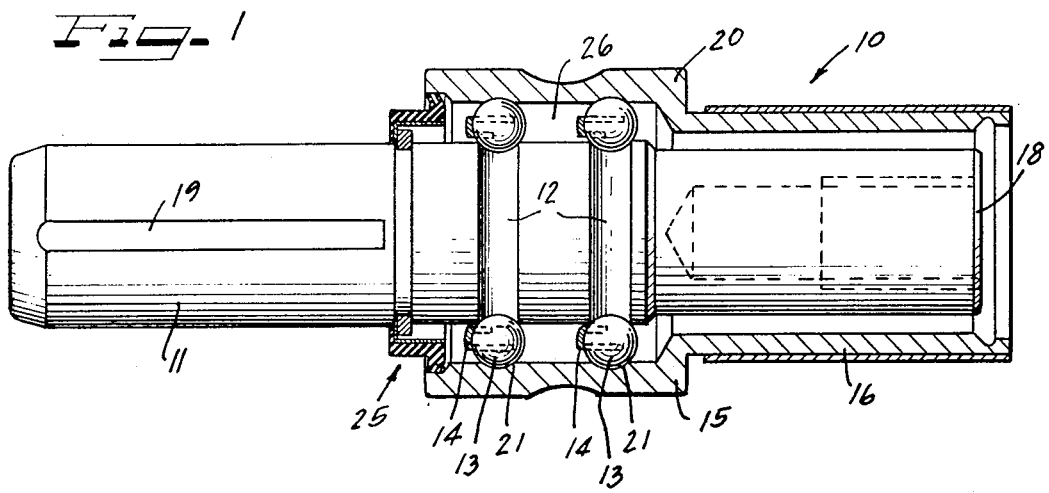
FIG. 1 is a cross sectional view of an anti-friction bearing assembly and shaft equipped with a seal of this invention.

FIG. 1 illustrates an anti-friction bearing and shaft assembly 10 including a shaft extension member 11 having race grooves 12 therein receiving a plurality of circumferentially spaced anti-friction balls 13 held in ball retainers 14. The balls support an outer race member 15 which surrounds the shaft 11 and has an axial extension 16 projecting beyond the anti-friction roller element section in circumferential relationship with the shaft. The shaft is tapped at one end as at 18 and has outer diameter flats 19 adjacent the other end for attachment purposes. The outer race member has a circumferential section 20 which has a pair of inner diameter grooves 21 forming the outer race paths of the bearing races and aligned with the inner races 12.

A seal assembly 25 is positioned adjacent one end of the portion 20 of the outer race 15 and seals the cavity 26 between the shaft and the inner diameter of the outer race.

Figure 2:
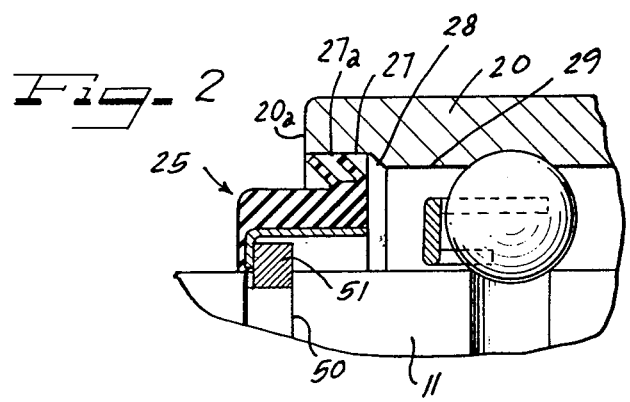
FIG. 2 is a fragmentary cross sectional view of an enlarged scale of the seal area of FIG. 1.

FIG. 2 illustrates the placement of the seal assembly 25 with respect to the shaft 11 and outer race portion 20. The axial end 20a of the outer race portion 20 has a diameter increasing counterbore 27 open to the end 20a and extending axially into the portion 20 terminating in a tapered wall 28 which extends inwardly to the normal diameter 29.

The counterbore 27 provides an inner diameter face 27a against which the lips of the seal ride.

Figure 3:
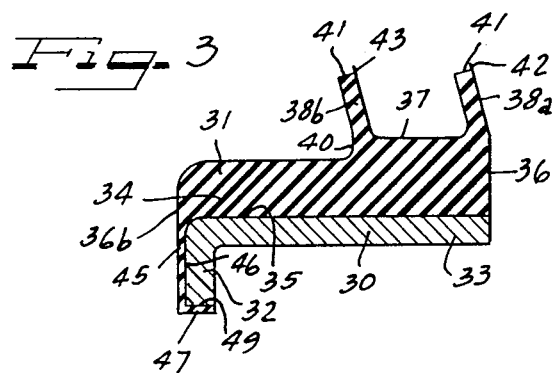
FIG. 3 is a cross sectional view of an enlarged scale of the seal member of FIGS. 1 and 2.

As is illustrated in FIG. 3, the seal assembly consists of a metallic backing member 30 and an elastic member 31. The backing member is an L-shaped cross section ring member having a short radially directed leg 32 interconnected with the axial end of a longer axially extending leg 33. The elastomeric member is ring shaped and is bonded to the outer surfaces of the metallic member 30. The elastomeric member has an axially extending body portion 34 which is bounded to the outer diameter face 35 of the backing member 30. The body portion 34 is radially thicker adjacent one end 36 providing a radially stiffer portion which terminates in its outer diameter 37 in two axially spaced apart circumferential lips 38. One of the lips 38a extends outwardly from the end 36 whereas the other lip 38b extends outwardly from the opposite axial end 40 of the radially thickened portion. The lips 38a and 38b are angled away from the end 36 approximately 15° from the radius. The lips terminate in a flat end land 41 at right angles to the angle of projection of the lips.

In the molding of the elastomeric sealing element, the lips are molded in such a way that all flash occurs at the axially outer end of the lands 41 closest to the end 36. Therefore, the possible flash points are indicated at 42 and 43. It is to be understood that these flash points are positioned at this axial end because it is at this end of the lands 41 that sealing normally occurs.

At the opposite axial end 36b of the elastomeric member, a radially projecting portion 45 may overlie the axially outer surface 46 of the radial leg 42 of metallic portion. Additionally, an axially extending portion 47 of the elastomer may underlie the inner diameter 49 of the radial leg 32. The seal assembly 25 is attached to the shaft 11 adjacent a groove 50 which receives a snap ring 51. The radial leg 32 is positioned on the axially outer side of the snap ring 51 away from the bearing assembly with the radial leg 32 abutting the snap ring 51. The snap ring holds the seal assembly 25 in place preventing it from moving axially inwardly towards the anti-friction elements. The inner diameter of the seal element 25 may be dimensioned with respect to the diameter of the shaft so that it is snugly received thereon, preferably with a press fit relation so as to be rotatable therewith.

The groove 50 is positioned with respect to the grooves 12 of the shaft so that the lips 38a and b underlie the surface 27a of the counterbore 27 where they will project radially into contact with the surface 27a. Preferably, the radial dimensions are such that the lips will be deformed from their normal 15° angle to the radius to a greater angle, in a preferred embodiment 45°, by contact with the surface 27a. In this manner, the lips are under compression rather than the tension and therefore the modulus of the material will not effect the efficiency of the seal to any great extend. The legs are angled away from the cavity 26 so as to be able to bleed excessive internal pressure.

Additionally the angling of the lips away from the cavity allows them to act as a rotating flinger preventing entry of foreign material.

Because the seal assembly 25 is attached to the shaft and rotates therewith, the centrifugal force will aid in maintaining sealing contacts between the lips and the surface 27a. Because of the fact that the lips are preferably under compression, they are able to accommodate a great degree of wear. In order to reduce the amount of wear which would otherwise occur, the surface 27a is preferably smooth ground.

It will therefore be appreciated that my invention provides a novel multiple lip seal assembly for sealing anti-friction bearing chambers, the seal including an elastomeric double lip seal assembly which is attached to a rotating shaft and which rides against a portion of the outer ring of the bearing assembly, the lips being formed at an angle to the radius away from the chamber.

Although various minor modifications might be suggested by those versed in the art, it should be understood that I wish to embody within the scope of the patent warranted hereon all such embodiments as reasonably and properly come within the scope of my contribution to the art.

I claim as my invention:

1. An anti-friction bearing assembly comrpising: a mounting member, said mounting member being ring shaped and having an L-shaped cross section with a short radially directed leg and a longer axially directed leg, an elastomeric sealing element, said elastomeric sealing element being ring shaped and having an axial length with a radially thicker portion adjacent one end thereof, said radially thicker portion terminating in its outer diameter in a pair of circumferential radially outwardly extending sealing lips, the said lips axially spaced from one another, the said lips projecting at a common angle to the radius, the said elastomeric member having its inner diameter bonded to the outer diameter of the mounting member to provide a combined assembly, the radially thicker portion positioned radially out from the axially directed leg and attached thereto axially spaced from the radially directed leg, the lips projecting from the combined assembly adjacent an axial end of the combined assembly remote from the radially directed leg, the radially directed leg extending radially inward from the axially directed leg, and the said combined assembly being attached to a rotating shaft at the inner diameter of the radially short leg, the lips contacting the inner diameter of an outer race ring surrounding the shaft whereby the lips project adjacent one axial end of the combined assembly and the radially directed leg projects in a direction opposite the lips, adjacent the other axial end of the assembly.

2. The assembly of claim 1 wherein the lips normally project at an angle of approximately 15° to the radius and are deformed to a greater angle of projection in contact with the race ring inner diameter.

3. An anti-friction bearing assembly comprising: a shaft, said shaft having race grooves in its surface, an outer race ring, said outer race ring having race grooves in the inner diameter thereof, said race grooves circumferentially aligned, anti-friction rolling elements received in said grooves, said outer race ring having a circumferential portion projecting axially beyond the said grooves, said circumferential portion terminating in an open axial end, said open axial end having a counterbore therein, said counterbore having an inner diameter axially extending surface, a seal element for said bearing assembly, said seal element comprising a backing member being ring shaped and L-shaped in cross section with a short radially directed leg integral with an axially directed leg at one end thereof, said seal assembly including an elastomeric member, said elastomeric member being ring shaped and having an axial length, said elastomeric member having a radial thickness, said radial thickness being increased adjacent one axial end, said increased radial thickness terminating in its outer diameter with a pair of radially projecting axially spaced apart, circumferential sealing lips, said lips projecting at an angle to the radius, said elastomeric element bonded to the outer diameter of the said metallic element, means attaching the said seal to the said shaft adjacent the said open axial end of the said outer ring, said means effective to space the said seal element from the said axial end such that the said radially thickened portion of the elastomer element underlies the said inner diameter surfaces of said counterbore, said lips contacting the said inner diameter surface of said counterbore, the said contact deforming the said lips to a greater angle to the radius, the said angle projecting away from the said grooves, and the said lips being circumferentially expansible under centrifugal force caused by the rotation of the said shaft with respect to the said outer ring.

* * * * *